United States Patent
Zhang et al.

(10) Patent No.: US 9,797,799 B2
(45) Date of Patent: Oct. 24, 2017

(54) INTELLIGENT ADAPTIVE SYSTEM AND METHOD FOR MONITORING LEAKAGE OF OIL PIPELINE NETWORKS BASED ON BIG DATA

(71) Applicant: Northeastern University, Shenyang (CN)

(72) Inventors: Huaguang Zhang, Shenyang (CN); Dazhong Ma, Shenyang (CN); Jian Feng, Shenyang (CN); Jinhai Liu, Shenyang (CN); Gang Wang, Shenyang (CN); Zhenning Wu, Shenyang (CN); Qiuye Sun, Shenyang (CN); Xiaoyu Li, Shenyang (CN)

(73) Assignee: Northeastern University, Shenyang (CN)

( * ) Notice: Subject to any disclaimer, the term of this patent is extended or adjusted under 35 U.S.C. 154(b) by 325 days.

(21) Appl. No.: 14/692,502

(22) Filed: Apr. 21, 2015

(65) Prior Publication Data
US 2015/0308919 A1    Oct. 29, 2015

(30) Foreign Application Priority Data
Apr. 28, 2014    (CN) .......................... 2014 1 0175170

(51) Int. Cl.
G01M 3/28    (2006.01)
G01M 3/24    (2006.01)

(52) U.S. Cl.
CPC .......... *G01M 3/2807* (2013.01); *G01M 3/243* (2013.01)

(58) Field of Classification Search
CPC ........................... G01M 3/2807; G01M 3/243
USPC .......................................................... 702/51
See application file for complete search history.

(56) References Cited

U.S. PATENT DOCUMENTS

| | | | |
|---|---|---|---|
| 6,970,808 B2 * | 11/2005 | Abhulimen | F17D 5/02 702/185 |
| 7,590,498 B1 * | 9/2009 | Chung | G01M 3/38 702/51 |

* cited by examiner

*Primary Examiner* — Fernando Hidalgo
(74) *Attorney, Agent, or Firm* — Muncy, Geissler, Olds & Lowe, P.C.

(57) ABSTRACT

The present invention relates to an intelligent adaptive system and method for monitoring leakage of oil pipeline networks based on big data. The present invention effectively analyzes a large amount of data collected on site within a reasonable time period and obtains a state of a pipeline network by an intelligent adaptive method, thereby obtaining a topological structure of a pipeline network. The present invention specifically adopts a flow balance method in combination with information conformance theory to analyze whether the pipeline network has leakage; small amount of leakage and slow leakage can be perfectly and accurately alarmed upon detection; as a generalized regression neural network is adopted to locate a leakage of the pipeline network, an accuracy of a result is increased. Therefore, the present invention adopts a policy and intelligent adaptive method based on big data to solve problems of detecting and locating leakage of the pipeline network.

4 Claims, 7 Drawing Sheets

INTELLIGENT ADAPTIVE SYSTEM AND METHOD FOR MONITORING LEAKAGE OF OIL PIPELINE NETWORKS BASED ON BIG DATA

CROSS-REFERENCE TO RELATED APPLICATION

This application claims the priority of Chinese patent application No. 201410175170.3, filed on Apr. 28, 2014, which is incorporated herewith by reference.

BACKGROUND OF THE INVENTION

1. Field of the Invention

The present invention relates to the technical field of pipeline network internal detection method, and particularly to an intelligent adaptive system and method for monitoring leakage of oil pipeline networks based on big data.

2. The Prior Arts

Pipeline transportation is an economical and convenient mode of transportation. Compared with other modes of transportation, pipeline transportation has the advantages of high efficiency, security, economy, and convenient control and management, therefore playing an important role in fluid conveying. In accordance with the "12th Five-Year Plan", the total length of gas and oil pipelines in China will reach about 150 thousand km by the end of 2015, among which: 25 thousand km of oil pipelines and 44 thousand km of gas pipelines will be newly built. However, accidents of pipeline leakage often occur due to the ageing of pipeline devices, the change of geographical conditions and the damage caused by human factors. When the accident of pipeline leakage occurs, it may not only cause explosion and fire, but also cause personal casualty. Therefore, it has great social significance and economic benefits to monitor fluid conveying pipelines in time and take corresponding emergency measures to prevent further expansion of leakage accident.

There are a plurality of methods for detecting leakage of fluid conveying pipelines, mainly including external environment detection, pipe wall detection and pipeline internal flow condition detection, wherein pipeline internal flow condition detection is the main method for detecting and locating leakage at present, and it further includes state model method, sound-wave-based method, pressure point analyzing method, negative pressure wave method, etc. Systems for detecting pipeline leakage based on pressure signals have been widely used, but these kinds of systems still have some common problems at present: first, missed alarm rate of small amount of leakage and slow leakage is high; second, the resistance of the systems against working condition disturbance is not strong, and false alarm rate is high.

At present, research on method for detecting and locating leakage of single pipelines has been relatively mature, but in engineering practice, there is a plurality of oil pipelines with one or more branches, namely pipeline networks. Information obtained from oil pipeline networks has the characteristics of large information amount and large data amount, and the signal collection of pressure, flow rate, etc. belongs to millisecond data, which fully reflects the characteristics of big data. Moreover, temperature and density can also be collected. In addition, the structures of oil pipeline networks are complex, which further increases the difficulties in detecting leakage of oil pipeline networks. Whereas the research on conveying by pipeline networks at present basically rests on conveying by single pipelines, it is not able to well grasp the analysis as a whole to detect the pipeline networks. Furthermore, during conveying by pipeline networks, the influence of working condition disturbance and system noise on pressure waves during propagation is greater, and pressure signal attenuation will be more severe, therefore, leakage detection sensitivity and location accuracy will be greatly decreased.

SUMMARY OF THE INVENTION

In terms of the disadvantages of the prior art and the specific characteristics of oil pipeline networks, the present invention provides an intelligent adaptive system and method for monitoring leakage of oil pipeline networks based on big data to achieve the objectives of increasing location accuracy and decreasing false alarm rate in practical application.

An intelligent adaptive system for monitoring leakage of oil pipeline networks based on big data, comprising an upper computer and a lower computer; the lower computer comprises a data collector, a filter circuit, an amplifying circuit and a PLC central processing unit.

The data collector is used for collecting millisecond pressure, millisecond flow rate, temperature and density at an inlet and outlet of a pipeline, conducting multi-source consistent processing to all kinds of collected signals, converting the signals into standard uniform data and sending them to the filter circuit.

The filter circuit is used for conducting noise filtering to the collected signals and sending the signals after filtering to the amplifying circuit.

The amplifying circuit is used for amplifying the collected signals and sending the signals after amplification to the PLC central processing unit.

The PLC central processing unit is used for conducting analogue-to-digital conversion to the collected signals, conducting time correction to a data at the inlet and outlet of each segment of the pipeline, and sending the signals after time correction to the upper computer.

The upper computer is used for obtaining an initial state of a pipeline network in accordance with states of valves and pumps, thereby obtaining a topological structure of the whole pipeline network.

The upper computer is used for determining the priority detection range of a pipeline network area by judging whether the difference between collected inlet flow rate and outlet flow rate exceeds a threshold.

The upper computer is used for determining whether a change of collected signals is human-induced by inspecting whether the states of all valves and pumps are the same as the initial states and judging whether the difference between the inlet and outlet flow rates is equal to an artificial defueling amount or an artificial refueling amount.

The upper computer is used for conducting conformance testing to the collected flow rates and determining whether the collected flow rates are effective.

The upper computer is used for determining a theoretical time difference between a pressure wave generated by a theoretical preset leakage point arriving at an upstream sensor and a downstream sensor, taking a sequence of the theoretical time difference and a sequence of a length of each segment of the pipeline as the input of a generalized regression neural network, taking a sequence of the distance from each preset leakage point to the inlet of the pipeline where the preset leakage point is located as an expected output, conducting training to obtain a nonlinear model, and putting an actual time difference between a pressure wave generated by a leakage point arriving at the upstream sensor and the downstream sensor into the nonlinear model obtained by training to obtain the location of an actual leakage point.

A monitoring method adopting the intelligent adaptive system for monitoring leakage of oil pipeline networks based on big data, comprising the following steps.

Step 1: Determining the initial state, namely an opening state or a closing state, of each valve and pump in the pipeline network, and obtaining the initial state of the pipeline network in accordance with the states of valves and pumps, thereby obtaining the topological structure of the whole pipeline network.

Step 2: Using the data collector to collect millisecond pressure, millisecond flow rate, temperature and density at the inlet and outlet of the pipeline, and conducting multi-source consistent processing to all kinds of collected signals, converting the signals into standard uniform data and sending them to the filter circuit.

Step 3: Using the PLC central processing unit to conduct analogue-to-digital conversion to the collected signals, conducting time correction to the data at the inlet and outlet of each segment of the pipeline, and sending the data to the upper computer for storage.

Step 4: Judging whether the difference between collected inlet flow rate and outlet flow rate exceeds the threshold; if so, investigating a historical working condition of the pipeline network and determining a monitoring station of the leakage point corresponding to a historical flow rate nearest to this flow rate, and taking the pipeline network area monitored by this monitoring station as the priority detection range; otherwise, returning to execute Step 2.

Step 5: Inspecting whether the states of all valves and pumps are the same as the initial states; if so, executing Step 7; otherwise, determining the artificial defueling amount or the artificial refueling amount of each valve and pump having state changes, determining the difference between the inlet and outlet flow rates of the pipeline network, and executing Step 6.

Step 6: Judging whether the difference between the inlet and outlet flow rates is equal to the artificial defueling amount or the artificial refueling amount; if not, executing Step 7; otherwise, returning to execute Step 2.

Step 7: Conducting conformance testing to the collected flow rates and determining whether the collected flow rates are effective as follows.

Judging whether $$F > \frac{M+2}{2R}$$

is true; if true, executing Step 7; otherwise, returning to execute Step 2, wherein M is a total number of sensors; R is a number of flow sensors installed at each monitoring station; F is a number of flow sensors collecting changed data.

Step 8: Determining the actual time difference between the pressure waves generated by the leakage point arriving at the upstream sensor and the downstream sensor.

The formula for calculating a cross correlation coefficient between a pressure signal value collected at an upstream end and the pressure signal value collected at a downstream end is as follows:

$$R_{x_i y_j} = \lim_{N \to \infty} \frac{1}{N} \sum_{t=1}^{N} x(t) y(t+\tau) \quad (1)$$

wherein N is a length of a pressure array, $$N = \frac{2 \times L}{(aT_S) + \Delta d},$$

$T_s$ is a time interval for sampling, L is a length of the pipeline between two adjacent monitoring stations, and $\Delta d$ is the time required by the flow rates of the fluid in the pipeline to change from an old steady-state to a new steady-state; x(t) is the pressure signal value collected at the upstream end; y(t) is the pressure signal value collected at the downstream end; $x_i$ is a monitoring station in the whole pipeline network, and i is a corresponding serial number of this monitoring station; $y_j$ is a monitoring station adjacent to the monitoring station $x_i$, and j is the corresponding serial number of the monitoring station $y_j$, $$\tau \in \left(-\frac{L}{a}, \frac{L}{a}\right),$$

and a is a wave velocity of the pressure wave.

Calculating a $\tau$ value corresponding to a maximum cross correlation coefficient, and this value is the actual time difference.

Step 9: Determining the theoretical time difference between the pressure waves generated by the theoretical preset leakage point arriving at the upstream sensor and the downstream sensor.

Step 9-1: Setting several preset leakage points on each pipeline of the pipeline network, and the distances between every two preset leakage points are equal.

Step 9-2: Determining the theoretical time difference between the pressure waves generated by each preset leakage point arriving at the upstream sensor and the downstream sensor.

The formula for calculating the theoretical time difference is as follows:

$$\tau_0 = \frac{L - x_l}{a+v} \frac{x_l}{a-v} \quad (2)$$

wherein v is a flow velocity of the fluid in the pipeline; $x_l$ is the distance from the preset leakage point to the inlet of the pipeline; $\tau_0$ is the theoretical time difference.

Step 10: Creating a sequence of the distance from each preset leakage point to the inlet of the pipeline where the preset leakage point is located, creating a sequence of the theoretical time difference between the pressure wave generated by each preset leakage point arriving at the upstream sensor and the downstream sensor, and creating the sequence of the length of each segment of pipeline.

Step 11: Taking a sequence of the theoretical time difference and a sequence of the length of each segment of the pipeline as the input of the generalized regression neural network, taking the sequence of the distance from each preset leakage point to the inlet of the pipeline where the preset leakage point is located as the expected output, and conducting training.

The nonlinear model obtained by training is as follows:

$$X_L = f(\Delta t, Y) \quad (3)$$

wherein $\Delta t$ is the sequence of the theoretical time difference; $X_L$ is the sequence of the distance from each preset leakage point to the inlet of the pipeline where the preset leakage point is located; Y is the sequence of the length of each segment of pipeline; $f(\Delta t, Y)$ is a nonlinear function of the sequence of the theoretical time difference, the sequence of the length of each segment of the pipeline, and the sequence of the distance from each preset leakage point to the inlet of the pipeline where the preset leakage point is located.

Step 12: Putting the actual time difference into the nonlinear model obtained by training to obtain a location of an actual leakage point.

Step 13: Storing and displaying the result.

The change of each collected flow rate judged in Step 4 is obtained by calculation or practical experience, wherein the formula for calculating the change of flow rate is as follows:

$$\Delta Q_i = E\{Q_{in} - Q_{out} - Q_r\} \quad (4)$$

wherein $\Delta Q_i$ is the difference between the inlet flow rate and the outlet flow rate when a thermal dynamic effect is taken into account; $Q_{in}$ is the inlet flow rate in an upstream segment of the pipeline; $Q_{out}$ is the outlet flow rate in a downstream segment of the pipeline; $E\{\bullet\}$ is a mathematical expectation; $Q_r$ is a calculated value of flow rate change of the fluid in the pipeline when the thermal dynamic effect is taken into account, $$Q_r = \frac{\pi \times D^2 \times K \times T}{4 \times P \times \lambda},$$

and D is the diameter of the pipeline; K is a correction coefficient relating to a correction parameter of the pipeline, and its value is from 0.91 to 0.95; T is an average of oil temperatures at the inlet and outlet of pipeline; P is a pressure intensity in the pipeline; $\lambda$ is a fluid viscosity, and the concrete value of $\lambda$ refers to the collected density.

The threshold in Step 4 is determined by: when the oil pipeline network is in a steady-state, collecting multiple sets of the pipeline inlet and outlet flow rates within a time period t, calculating the average of the flow rates in the first half of time period t, calculating the average of the flow rates in the second half of time period t, and calculating the difference between the two averages; if the difference is between 0.001 and 0.01, the threshold is the obtained difference; otherwise, respectively scratching a maximum flow rate and a minimum flow rate in the first half of time period t and the second half of time period t, and calculating an average of the flow rates in the first half of time period t and an average of the flow rates in the second half of time period t again until the threshold is obtained.

Advantages of the Present Invention

The present invention relates to an intelligent adaptive system and method for monitoring leakage of oil pipeline networks based on big data, which can effectively analyze a large amount of data collected on site within a reasonable time period and obtain the state of a pipeline network by an intelligent adaptive method, thereby obtaining the topological structure of the pipeline network. The present invention specifically adopts a flow balance method in combination with information conformance theory to analyze whether the pipeline network has leakage; the method is intuitive and simple, and has high sensitivity and low false alarm rate; small amount of leakage and slow leakage can be perfectly and accurately alarmed upon detection; as a generalized regression neural network is adopted to locate the leakage of the pipeline network, the accuracy of the result is increased. Therefore, the present invention adopts a policy and intelligent adaptive method based on big data to solve the problems of detecting and locating leakage of the pipeline network, which can simultaneously achieve the objectives of high precision and high accuracy.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

One embodiment of the present invention is further described in combination with the figures.

Figure 1:
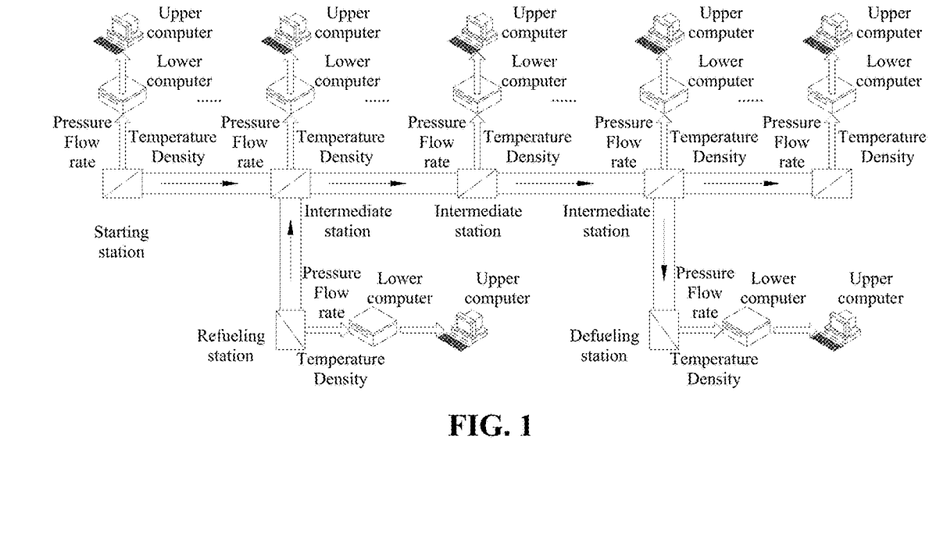
FIG. 1 is the structural diagram of the system for one embodiment of the present invention.
Figure 2:
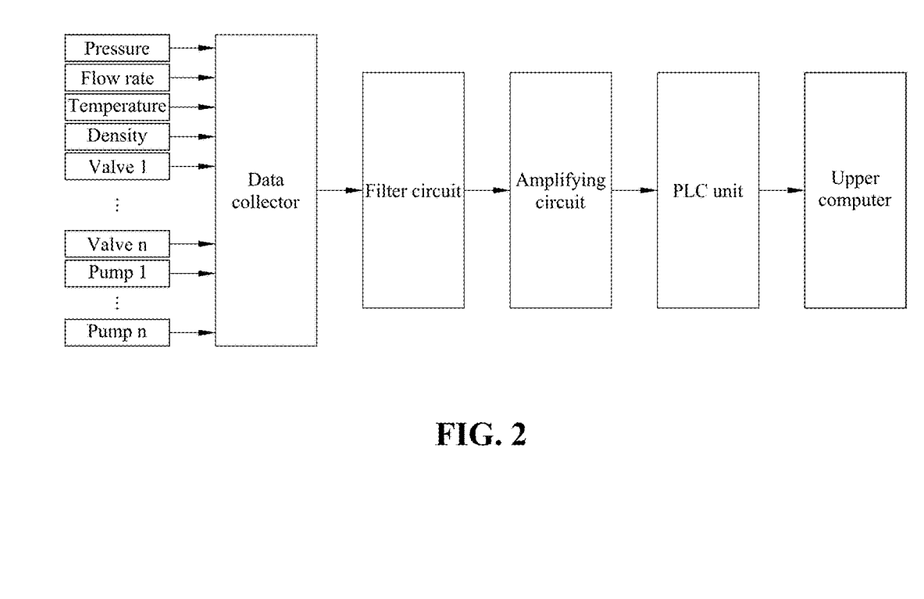
FIG. 2 is the structural block diagram of the hardware circuit for one embodiment of the present invention.

As shown in FIG. 1 and FIG. 2, an intelligent adaptive system for monitoring leakage of oil pipeline networks based on big data, characterized by comprising an upper computer and a lower computer; the lower computer comprises a data collector, a filter circuit, an amplifying circuit and a PLC central processing unit, wherein the data collector is used for collecting millisecond pressure, millisecond flow rate, temperature and density at an inlet and outlet of a pipeline, conducting multi-source consistent processing to all kinds of collected signals, converting the signals into standard uniform data and sending them to the filter circuit; the filter circuit is used for conducting noise filtering to the collected signals and sending the signals after filtering to the amplifying circuit; the amplifying circuit is used for amplifying the collected signals and sending the signals after amplification to the PLC central processing unit; the PLC central processing unit is used for conducting analogue-to-digital conversion to the collected signals, conducting time correction to the data at the inlet and outlet of each segment of the pipeline, and sending the signals after time correction to the upper computer; the upper computer is used for obtaining an initial state of a pipeline network in accordance with the states of valves and pumps, thereby obtaining a topological structure of the whole pipeline network; is used for determining a priority detection range of a pipeline network area by judging whether the difference between collected inlet flow rate and outlet flow rate exceeds a threshold; is used for determining whether a change of collected signals is human-induced by inspecting whether the states of all valves and pumps are the same as the initial states and judging whether the difference between inlet and outlet flow rates is equal to an artificial defueling amount or an artificial refueling amount; is used for conducting conformance testing to the collected flow rates and determining whether the collected flow rates are effective; is used for determining a theoretical time difference between a pressure wave generated by a theoretical preset leakage point arriving at an upstream sensor and a downstream sensor, taking a sequence of the theoretical time difference and a sequence of a length of each segment of the pipeline as the input of a generalized regression neural network, taking a sequence of the distance from each preset leakage point to the inlet of the pipeline where the preset leakage point is located as an expected output, conducting training to obtain a nonlinear model, and putting an actual time difference between a pressure wave generated by a leakage point arriving at the upstream sensor and the downstream sensor into the nonlinear model obtained by training to obtain the location of an actual leakage point.

In the embodiment of the present invention, data signals are transferred in one direction only. At the construction site, a large amount of millisecond data being detected, such as pressure, flow rate, temperature and density, is sent to the data collector for signal processing; the state of each pump is collected and stored in a database; and the initial state of a pipeline network is obtained in accordance with the states of valves and pumps, thereby obtaining the topological structure of the whole pipeline network. The data signals are filtered by the filter circuit, amplified by the amplifying circuit, sent to an A/D conversion module of the PLC after processing, and finally transferred to the upper computer through a communication interface.

Figure 3:
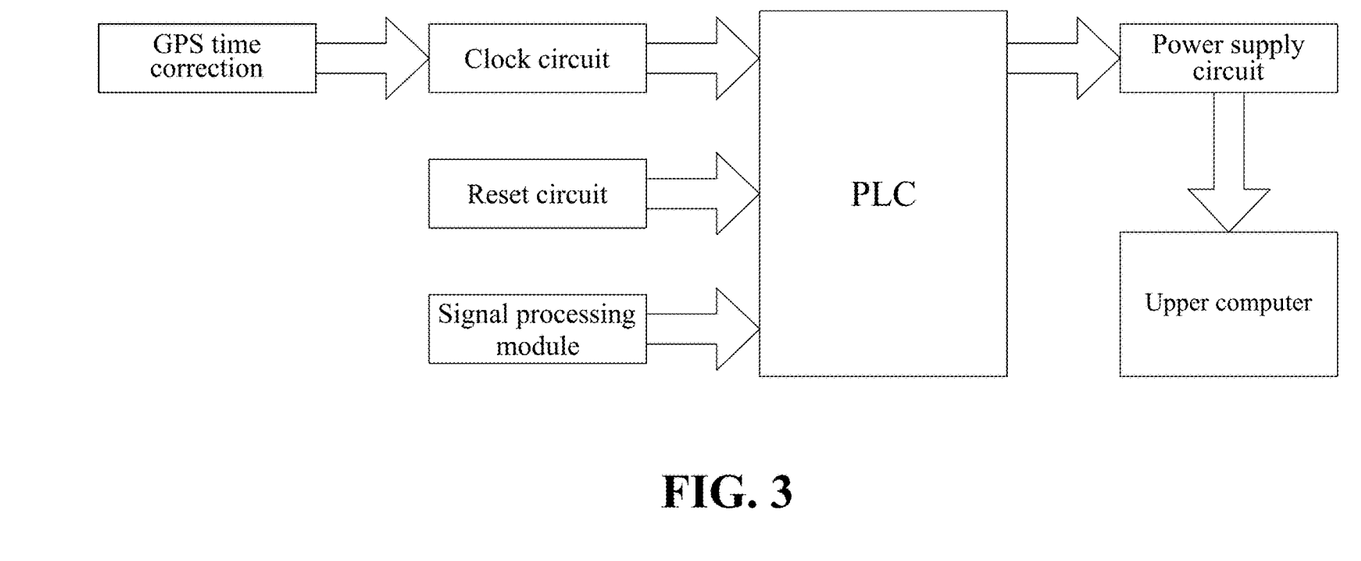
FIG. 3 is the structural diagram of the lower computer circuit in the hardware for one embodiment of the present invention.

As shown in FIG. 3, in the embodiment of the present invention, the PLC unit comprises a GPS time correction module, a clock circuit, a reset circuit, a signal processing module and a power supply circuit to achieve the objective of making the data collected upstream and downstream synchronous in time; the amplifying circuit is connected with the A/D conversion interface of the PLC unit to achieve the conversion from analogue signals to digital signals; the output end of the PLC unit is connected to the upper computer; the PLC unit uses a PEC9000 type module, and the GPS time correction module is of DNF4533F type; the filter circuit uses a EDP type chip, the amplifying circuit uses a NE5532 type chip, and the data collector is of SYAD02C type.

Based on the above mentioned devices, the present invention provides an intelligent adaptive system for monitoring leakage of oil pipeline networks. The system adopts a policy based on big data to conduct analysis, obtains the state of the pipeline network in combination with the intelligent adaptive method and obtains the topological structure of the pipeline network. The present invention specifically uses information conformance theory to accurately identify the current operating condition of the pipeline network by monitoring the flow sensors in real time, and uses the change of flow rate to accurately judge whether the pipeline network has leakage. A model is built using the generalized regression neural network, thereby a response can be made and a leakage point can be located accurately in a short time.

Figure 4A:
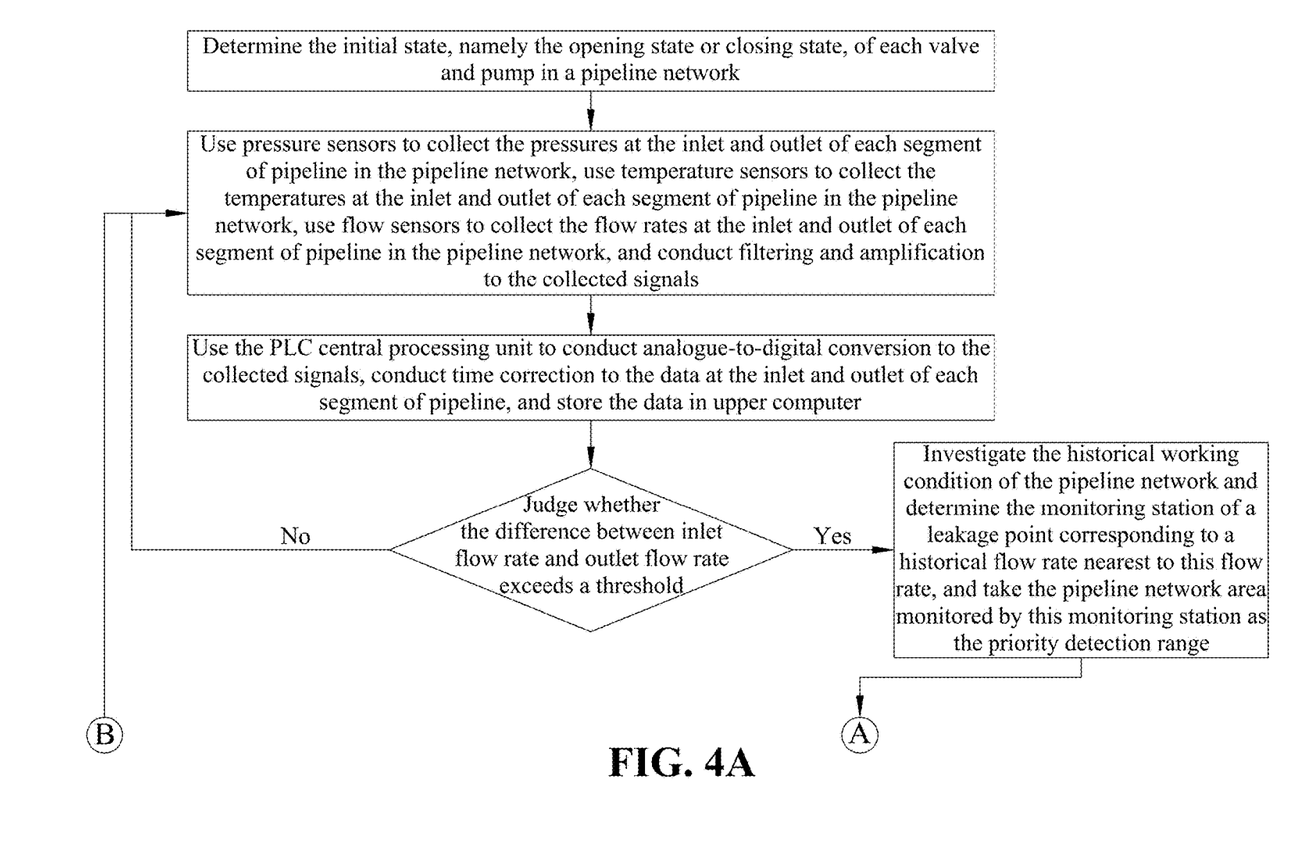
FIGS. 4A, 4B and 4C are the flow chart of the intelligent adaptive system and method for monitoring leakage of oil pipeline networks based on big data for one embodiment of the present invention.
Figure 4B:
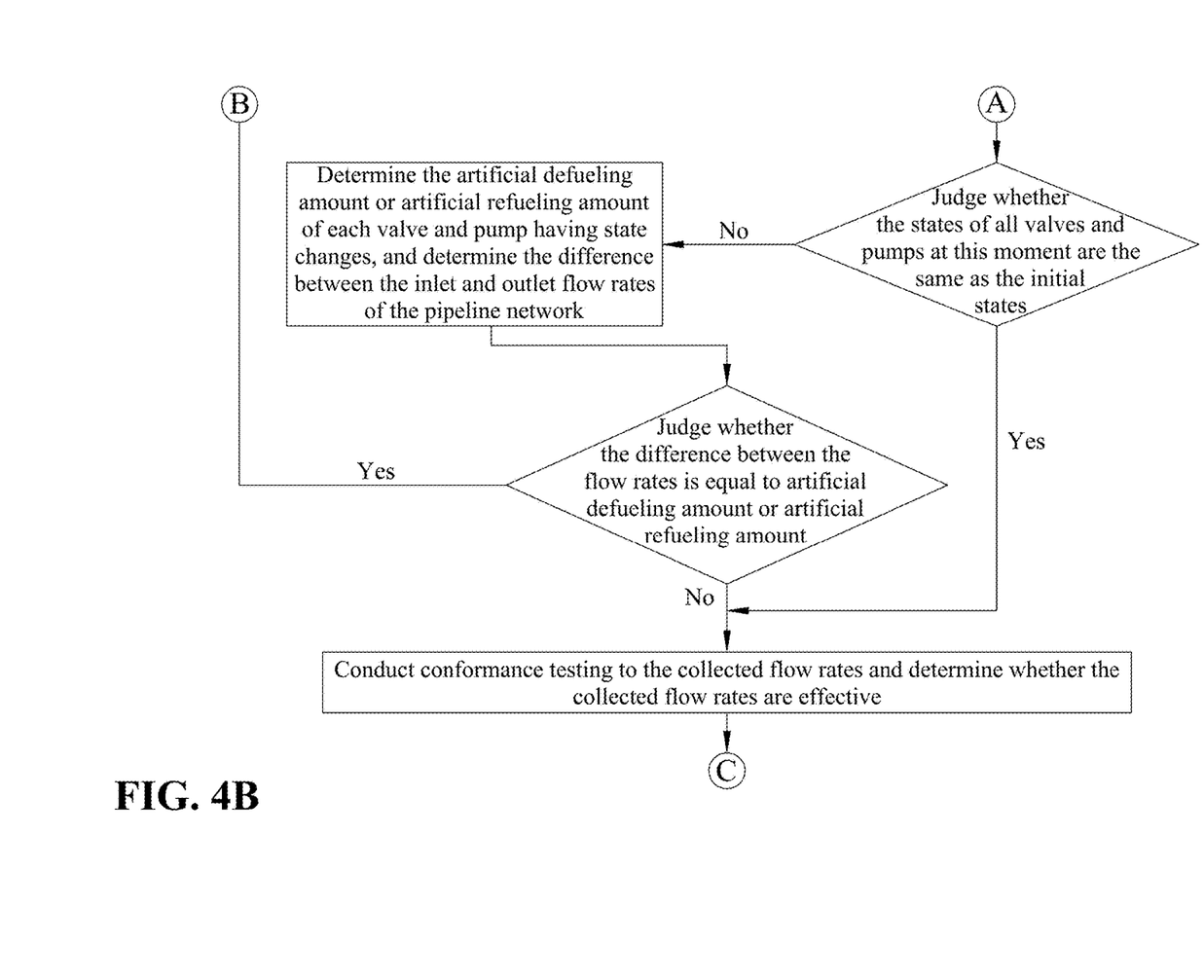
Figure 4C:
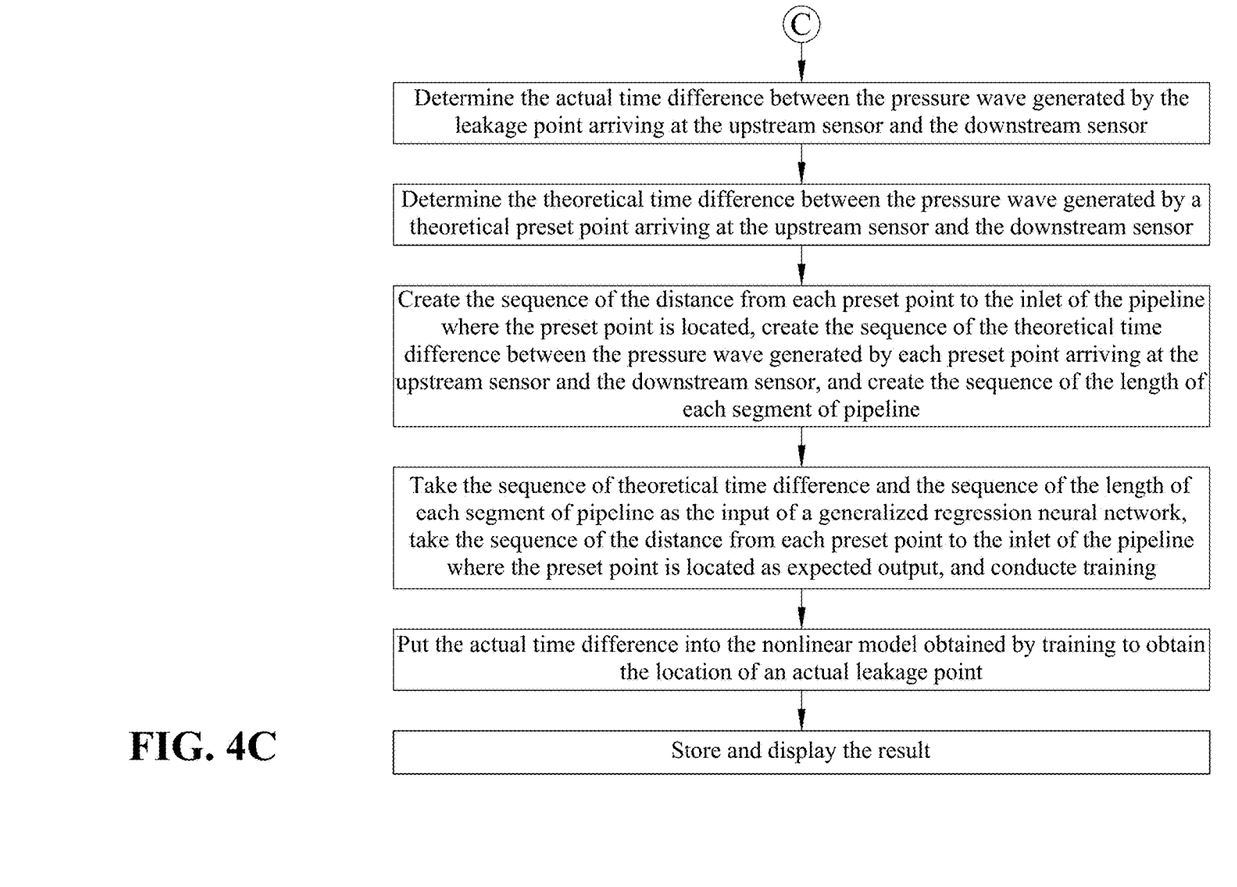

An intelligent adaptive method for monitoring leakage of oil pipeline networks based on big data, with the flow chart shown in FIG. 4, comprising the following steps.

Step 1: Determining the initial state, namely an opening state or a closing state, of each valve and pump in the pipeline network, and obtaining the initial state of the pipeline network in accordance with the states of valves and pumps, thereby obtaining the topological structure of the whole pipeline network.

In the embodiment of the present invention, in combination with the intelligent adaptive method, when the valves and pumps are in the opening state, the condition of their corresponding station is reflected in the topological structure of the pipeline network; when the valves and pumps are in the closing state, the condition of their corresponding station is not reflected.

Step 2: Using the data collector to collect millisecond pressure, millisecond flow rate, temperature and density at the inlet and outlet of the pipeline, and conducting multi-source consistent processing to collected signals, converting the signals into standard unified data and sending them to the filter circuit.

In the embodiment of the present invention, various kinds of data collected on site used for detecting leakage of the pipeline networks includes pressure, flow rate, temperature, density, etc., and such data is multi-source data, therefore, intelligent adaptive method us used to unify and to store the data and the collected states of pumps and valves in the database by classification.

Step 3: Using the PLC central processing unit to conduct analogue-to-digital conversion to the collected signals, conducting time correction to the data at the inlet and outlet of each segment of the pipeline, and sending the data to the upper computer for storage.

The key to accurately locate pipeline leakage is to gather the data collected simultaneously at upstream and downstream ends via a network communication so as to obtain the accurate time difference between a leakage signal arriving at the upstream end and downstream ends. The accuracy of this time difference has a direct influence on the result of leakage locating. To increase the accuracy of the time difference, the data collected at the upstream and downstream ends need to be synchronized in time. Therefore, the embodiment of the present invention adopts a GPS to synchronize the time upstream and downstream of the system for monitoring pipeline leakage, thus to eliminate the time difference between upstream and downstream data caused by communication delay between Remote Terminal Units (RTUs) on both ends and a server, and achieve the purpose of increasing location accuracy.

Step 4: Judging whether the difference between collected inlet flow rate and outlet flow rate exceeds the threshold; if so, checking a historical working condition of the pipeline network and determining a monitoring station of the leakage point corresponding to a historical flow rate nearest to this flow rate, and taking the pipeline network area monitored by this monitoring station as the priority detection range; otherwise, returning to execute Step 2; in the embodiment, t is 10 min.

The threshold is determined by: when the oil pipeline network is in a steady-state, collecting multiple sets of the pipeline inlet and outlet flow rates within a time period t, calculating an average of the flow rates in the first half of time period t, calculating an average of the flow rates in the second half of time period t, and calculating the difference between the two averages; if the difference is between 0.001 and 0.01, the threshold is the obtained difference; otherwise, respectively scratching a maximum flow rate and a minimum flow rate in the first half of time period t and the second half of time period t, and calculating an average of the flow rates in the first half of time period t and an average of the flow rates in the second half of time period t again until the threshold is obtained.

The formula for calculating the change of flow rate is as follows:

$$\Delta Q_i = E\{Q_{in} - Q_{out} - Q_r\} \quad (4)$$

wherein $\Delta Q_i$ is the difference between the inlet flow rate and the outlet flow rate when a thermal dynamic effect is taken into account; $Q_{in}$ is the inlet flow rate in the upstream segment of the pipeline; $Q_{out}$ is the outlet flow rate in the downstream segment of the pipeline; $E\{\bullet\}$ is a mathematical expectation; $Q_r$ is a calculated value of a flow rate change of the fluid in the pipeline when thermal dynamic effect is taken into account, $$Q_r = \frac{\pi \times D^2 \times K \times T}{4 \times P \times \lambda},$$

and D is a diameter of the pipeline; K is a correction coefficient relating to the correction parameter of the pipeline, and its value is from 0.91 to 0.95; T is an average of oil temperatures at the inlet and outlet of pipeline; P is the pressure intensity in the pipeline; λ is a fluid viscosity, and its concrete value is determined by referring to the collected density. In the embodiment, $\Delta Q_i$ is 0.005.

In the embodiment of the present invention, when the change of flow rate detected by a monitoring station in the oil pipeline network in a short time exceeds the alert threshold, use a historical information stored in the PLC and the database to obtain all working condition adjustment information that has influence on the running state change of the monitoring station, and query the database in accordance with the adjustment information and in combination with similar conditions in a historical record to obtain all working condition adjustment information of other monitoring stations adjacent to the monitoring station, thereby narrowing the investigation scope.

Step 5: Inspecting whether the states of all valves and pumps are the same as the initial states; if so, executing Step 7; otherwise, determining the oil quantity change of each valve and pump having state changes, determining the difference between the inlet and outlet flow rates of the pipeline network, and executing Step 6.

Step 6: Judging whether the difference between the inlet and outlet flow rates is equal to the artificial defueling amount or the artificial refueling amount; if not, executing Step 7; otherwise, returning to execute Step 2.

In the embodiment of the present invention, when state changes of valves and pumps in a segment of the pipeline are detected, judge whether the change of flow rate satisfies: $\Delta q = |Q_{in} - Q_{out}|$, wherein $\Delta q$ is the artificial defueling amount or the artificial refueling amount at this time; if the formula is satisfied, the alert for this time is shielded; otherwise, the alert is given on the event that the flow rate exceeds the threshold.

Step 7: Conducting conformance testing to the collected flow rates and determining whether the collected flow rates are effective as follows.

In the embodiment of the present invention, if a leakage occurs, changes of flow rate can be detected by the flow sensor at each end, however, subtle changes of flow rate may not be accurately detected by the flow sensors at some ends due to the influence of various factors in practice, such as noise jamming and operating state of the sensors. Therefore, the method suggested by the present invention is to set up a plurality of criteria for judging sensor signal detection consistency, that is judging whether $$F > \frac{M+2}{2R}$$

is true; if true, executing Step 7; otherwise, returning to execute Step 2; in the embodiment of the present invention, judge whether the number of flow sensors with data change is greater than 4, wherein M is a total number of flow sensors; R is a number of flow sensors installed at each monitoring station; F is a number of the flow sensors collecting changed data; in the embodiment, M is 7, and R is 1.

Step 8: Determining the actual time difference between the pressure waves generated by the leakage point arriving at the upstream sensor and the downstream sensor.

The embodiment of the present invention adopts the method of conducting correlation analysis to the leakage signals collected by upstream and downstream Remote Terminal Units (RTUs) to calculate the time difference. The method is based on the correlation of leakage signals received at upstream and downstream monitoring points as well as the time difference between the leakage signal generated by a time representation corresponding to the largest cross correlation coefficient is propagated to the upstream and downstream monitoring points.

The formula for calculating a cross correlation coefficient between a pressure signal value collected at an upstream end and the pressure signal value collected at downstream end is as follows:

$$R_{x_i y_j} = \lim_{N \to \infty} \frac{1}{N} \sum_{t=1}^{N} x(t) y(t+\tau) \quad (1)$$

wherein N is a length of a pressure array, $$N = \frac{2 \times L}{(aT_S) + \Delta d},$$

$T_s$ is a time interval for sampling, L is a length of the pipeline between two adjacent monitoring stations, and $\Delta d$ is the time required by the flow rates of the fluid in the pipeline to change from an old steady-state to a new steady-state; when correlation analysis algorithm is conducted by a computer, the value of N decides the final accuracy of the cross correlation coefficient, and upstream and downstream leakage signals are stored in two arrays; the two computer arrays need to be updated after each sampling (to remove old leakage signals and read new leakage signals). In the embodiment, L is 10 km, a is 1000 m/s, $T_s$ is 0.001 s, and $\Delta d$ is 4 s.

x(t) is the pressure signal value collected at the upstream end; y(t) is the pressure signal value collected at the downstream end; $x_i$ is a monitoring station in the whole pipeline network, and i is a corresponding serial number of this monitoring station; $y_j$ is a monitoring station adjacent to the monitoring station $x_i$, and j is the corresponding serial number of the monitoring station $y_j$, $$\tau \in \left(-\frac{L}{a}, \frac{L}{a}\right),$$

and a is a wave velocity of the pressure wave.

In the embodiment of the present invention, data with a length of 5 min is selected to conduct a correlation calculation. If the formula above is directly used in the calculation, a calculation complexity is $O(N^2)$; when the pipeline is long, the sampling rate is high, and the calculation amount is large. In the embodiment of the present invention, the algorithm of fast Fourier transform is used, which can greatly reduce a total calculation amount and the calculation complexity. When no leakage occurs, the correlation function will be maintained at a small value; when leakage occurs and $\tau=\tau_0'$, $R(\tau)$ will reach it maximum value, namely $R(\tau_0')=\max R(\tau)$, and $R(\tau)$ corresponding to the maximum value of correlation function $\tau$ is deemed to be $\tau_0'$ which is the actual time difference.

Step 9: Determining the theoretical time difference between the pressure waves generated by the theoretical preset leakage point arriving at the upstream sensor and the downstream sensor.

Step 9-1: Setting several preset leakage points on each pipeline of the pipeline network, and the distances between every two preset leakage points are equal.

Step 9-2: Determining the theoretical time difference between the pressure waves generated by each preset leakage point arriving at the upstream sensor and the downstream sensor.

The formula for calculating the theoretical time difference is as follows:

$$\tau_0 = \frac{L-x_l}{a+v} \frac{x_l}{a-v} \quad (2)$$

wherein v is a flow velocity of the fluid in the pipeline; $x_l$ is the distance from the preset leakage point to the inlet of the pipeline; $\tau_0$ is the theoretical time difference; in the embodiment, v is ignored.

Step 10: Creating a sequence of the distance from each preset leakage point to the inlet of the pipeline where the preset leakage point is located, creating a sequence of the theoretical time difference between the pressure wave generated by each preset leakage point arriving at the upstream sensor and the downstream sensor, and creating the sequence of the length of each segment of pipeline.

Figure 5:
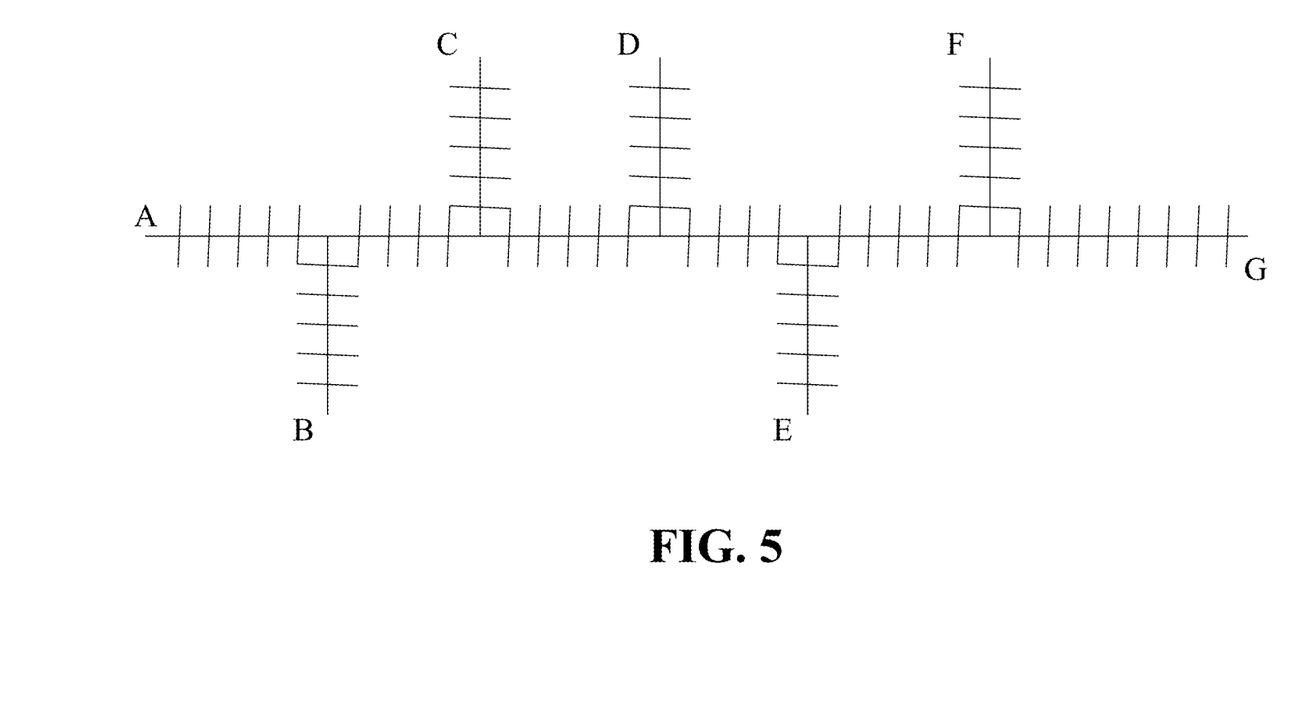
FIG. 5 is the topological diagram for one embodiment of the present invention.

As shown in FIG. 5, in the embodiment of the present invention, assume that the pipeline network has 7 end points $E_1$, $E_2$, $E_3$, $E_4$, $E_5$, $E_6$, $E_7$ (A, B, C, D, E, F and G in the figure) in total, and assume that the leakage occurs at a point 150 m away from an upstream detecting point, then set 66 preset leakage points $S_1$, $S_2$, $S_3$ . . . $S_{66}$ set at equal distances in the pipeline network starting from the first monitoring station, and create the sequence of the distance from each preset leakage point to the inlet of the pipeline where the preset leakage point is located, namely a simulated leakage location sequence $X_L=[S_1, S_2, S_3 \ldots S_{66}]$; calculate the sequence of the theoretical time difference $\Delta t=\tau_{0_1}, \tau_{0_2}, \ldots \tau_{0_{66}}$; summarize the location of a starting station from the practice, and create the sequence of locations, namely the sequence of the length of each segment of pipeline $Y=[Y_1, Y_2, Y_3 \ldots Y_{12}]$.

Step 11: Taking a sequence of the theoretical time difference and a sequence of the length of each segment of the pipeline as the input of the generalized regression neural network, taking the sequence of the distance from each preset leakage point to the inlet of the pipeline where the preset leakage point is located as the expected output, and conducting training.

The nonlinear model obtained by training is as follows:

$$X_L = f(\Delta t, Y) \quad (3)$$

wherein $\Delta t$ is the sequence of the theoretical time difference; $X_L$ is the sequence of the distance from each preset leakage point to the inlet of the pipeline where the preset leakage point is located; Y is the sequence of the length of each segment of pipeline; $f(\Delta t, Y)$ is a nonlinear function of the sequence of the theoretical time difference, the sequence of the length of each segment of the pipeline, and the sequence of the distance from each preset leakage point to the inlet of the pipeline where the preset leakage point is located.

Step 12: Putting the actual time difference into the nonlinear model obtained by training to obtain a location of an actual leakage point.

Step 13: Storing and displaying the result.

In the embodiment of the present invention, after the location of the leakage point is determined, it will be sent to the upper computer by the remote terminal units, then the upper computer will display leakage information as required, update the curve, and make responses to some other operations.

What is claimed is:

1. An intelligent adaptive system for monitoring leakage of oil pipeline networks based on big data, comprising an upper computer and a lower computer; the lower computer comprises a data collector, a filter circuit, an amplifying circuit and a PLC central processing unit,
   wherein the data collector is used for collecting millisecond pressure, millisecond flow rate, temperature and density at an inlet and outlet of a pipeline, conducting multi-source consistent processing to all kinds of collected signals, converting the signals into standard uniform data and sending them to the filter circuit,
   wherein the filter circuit is used for conducting noise filtering to the collected signals and sending the signals after filtering to the amplifying circuit,
   wherein the amplifying circuit is used for amplifying the collected signals and sending the signals after amplification to the PLC central processing unit,
   wherein the PLC central processing unit is used for conducting analogue-to-digital conversion to the collected signals, conducting time correction to the data at the inlet and outlet of each segment of the pipeline, and sending the signals after time correction to the upper computer,
   wherein the upper computer is used for obtaining an initial state of a pipeline network in accordance with states of valves and pumps, thereby obtaining a topological structure of the whole pipeline network,
   wherein the upper computer is used for determining a priority detection range of a pipeline network area by judging whether the difference between collected inlet flow rate and outlet flow rate exceeds a threshold;
   wherein the upper computer is used for determining whether a change of collected signals is human-induced by inspecting whether the states of all valves and pumps are the same as the initial states and judging whether the difference between flow rates is equal to an artificial defueling amount or an artificial refueling amount, wherein the upper computer is used for conducting conformance testing to the collected flow rates and determining whether the collected flow rates are effective, and wherein the upper computer is used for determining a theoretical time difference between a pressure wave generated by a theoretical preset leakage point arriving at an upstream sensor and a downstream sensor, taking a sequence of the theoretical time difference and a sequence of a length of each segment of the pipeline as the input of a generalized regression neural network, taking a sequence of the distance from each preset leakage point to the inlet of the pipeline where the preset leakage point is located as an expected output, conducting training to obtain a nonlinear model, and putting an actual time difference between a pressure wave generated by a leakage point arriving at the upstream sensor and the downstream sensor into the nonlinear model obtained by training to obtain the location of an actual leakage point.

2. An intelligent adaptive method for monitoring leakage of oil pipeline networks based on big data of claim 1, comprising the following steps:

Step 1: Determining the initial state, namely an opening state or a closing state, of each valve and pump in the pipeline network, and obtaining the initial state of the pipeline network in accordance with the states of valves and pumps, thereby obtaining the topological structure of the whole pipeline network;

Step 2: Using the data collector to collect millisecond pressure, millisecond flow rate, temperature and density at the inlet and outlet of the pipeline, and conducting multi-source consistent processing to all kinds of collected signals, converting the signals into standard uniform data and sending them to the filter circuit;

Step 3: Using the PLC central processing unit to conduct analogue-to-digital conversion to the collected signals, conducting time correction to the data at the inlet and outlet of each segment of the pipeline, and sending the data to the upper computer for storage;

Step 4: Judging whether the difference between collected inlet flow rate and outlet flow rate exceeds the threshold; if so, investigating a historical working condition of the pipeline network and determining a monitoring station of the leakage point corresponding to a historical flow rate nearest to this flow rate, and taking the pipeline network area monitored by this monitoring station as the priority detection range; otherwise, returning to execute Step 2;

Step 5: Inspecting whether the states of all valves and pumps are the same as the initial states; if so, executing Step 7; otherwise, determining the artificial defueling amount or the artificial refueling amount of each valve and pump having state changes, determining the difference between the inlet and outlet flow rates of the pipeline network, and executing Step 6;

Step 6: Judging whether the difference between the inlet and outlet flow rates is equal to the artificial defueling amount or the artificial refueling amount; if not, executing Step 7; otherwise, returning to execute Step 2;

Step 7: Conducting conformance testing to the collected flow rates and determining whether the collected flow rates are effective as follows:

Judging whether $$F > \frac{M+2}{2R}$$

is true; if true, executing Step 7; otherwise, returning to execute Step 2, wherein M is a total number of sensors; R is a number of flow sensors installed at each monitoring station; F is a number of the flow sensors collecting changed data;

Step 8: Determining the actual time difference between the pressure waves generated by the leakage point arriving at the upstream sensor and the downstream sensor, wherein the formula for calculating a cross correlation coefficient between a pressure signal value collected at an upstream end and the pressure signal value collected at a downstream end is as follows:

$$R_{x_i y_j} = \lim_{N \to \infty} \frac{1}{N} \sum_{t=1}^{N} x(t) y(t + \tau), \quad (1)$$

wherein N is a length of a pressure array, $$N = \frac{2 \times L}{(aT_S) + \Delta d},$$

$T_s$ is a time interval for sampling, L is a length of the pipeline between two adjacent monitoring stations, and $\Delta d$ is the time required by the flow rates of the fluid in the pipeline to change from an old steady-state to a new steady-state; x(t) is the pressure signal value collected at the upstream end; y(t) is the pressure signal value collected at the downstream end; $x_i$ is a monitoring station in the whole pipeline network, and i is a corresponding serial number of this monitoring station; $y_j$ is a monitoring station adjacent to the monitoring station $x_i$, and j is the corresponding serial number of the monitoring station $y_j$, $$\tau \in \left(-\frac{L}{a}, \frac{L}{a}\right),$$

and a is a wave velocity of the pressure wave;

Calculating a $\tau$ value corresponding to a maximum cross correlation coefficient, and this value is the actual time difference;

Step 9: Determining the theoretical time difference between the pressure waves generated by the theoretical preset leakage point arriving at the upstream sensor and the downstream sensor;

Step 9-1: Setting several preset leakage points on each pipeline of the pipeline network, and the distances between every two preset leakage points are equal;

Step 9-2: Determining the theoretical time difference between the pressure waves generated by each preset leakage point arriving at the upstream sensor and the downstream sensor, wherein the formula for calculating the theoretical time difference is as follows:

$$\tau_0 = \frac{L - x_l}{a + v} - \frac{x_l}{a - v}, \quad (2)$$

wherein v is a flow velocity of the fluid in the pipeline; $x_l$ is the distance from the preset leakage point to the inlet of the pipeline; $\tau_0$ is the theoretical time difference;

Step 10: Creating a sequence of the distance from each preset leakage point to the inlet of the pipeline where the preset leakage point is located, creating a sequence of the theoretical time difference between the pressure wave generated by each preset leakage point arriving at the upstream sensor and the downstream sensor, and creating the sequence of the length of each segment of pipeline;

Step 11: Taking a sequence of the theoretical time difference and a sequence of the length of each segment of the pipeline as the input of the generalized regression neural network, taking the sequence of the distance from each preset leakage point to the inlet of the pipeline where the preset leakage point is located as the expected output, and conducting training, wherein the nonlinear model obtained by training is as follows:

$$X_L = f(\Delta t, Y) \quad (3),$$

wherein $\Delta t$ is the sequence of the theoretical time difference; $X_L$ is the sequence of the distance from each preset leakage point to the inlet of the pipeline where the preset leakage point is located; Y is the sequence of the length of each segment of pipeline; $f(\Delta t, Y)$ is a nonlinear function of the sequence of the theoretical time difference, the sequence of the length of each segment of the pipeline, and the sequence of the distance from each preset leakage point to the inlet of the pipeline where the preset leakage point is located;

Step 12: Putting the actual time difference into the nonlinear model obtained by training to obtain a location of an actual leakage point; and Step 13: Storing and displaying the result.

3. The intelligent adaptive method of claim 2, wherein the change of each collected flow rate judged in Step 4 is obtained by calculation or practical experience, wherein the formula for calculating the change of flow rate is as follows:

$$\Delta Q_i = E\{Q_{in} - Q_{out} - Q_r\} \quad (4),$$

wherein $\Delta Q_i$ is the difference between the inlet flow rate and the outlet flow rate when a thermal dynamic effect is taken into account; $Q_{in}$ is the inlet flow rate in a upstream segment of the pipeline; $Q_{out}$ is the outlet flow rate in the downstream segment of the pipeline; $E\{\bullet\}$ is a mathematical expectation; $Q_r$ is a calculated value of flow rate change of the fluid in the pipeline when the thermal dynamic effect is taken into account, $$Q_r = \frac{\pi \times D^2 \times K \times T}{4 \times P \times \lambda},$$

and D is a diameter of the pipeline; K is a correction coefficient relating to a correction parameter of the pipeline, and its value is from 0.91 to 0.95; T is an average of oil temperatures at the inlet and outlet of the pipeline; P is a pressure intensity in the pipeline; $\lambda$ is a fluid viscosity, and a concrete value of $\lambda$ refers to the collected density.

4. The intelligent adaptive method of claim 2, wherein when the oil pipeline network is in a steady-state, collecting multiple sets of the pipeline inlet and outlet flow rates within a time period t, calculating the average of the flow rates in the first half of time period t, calculating the average of the flow rates in the second half of time period t, and calculating the difference between the two averages; if the difference is between 0.001 and 0.01, the threshold is the obtained difference; otherwise, respectively scratching a maximum flow rate and a minimum flow rate in the first half of time period t and the second half of time period t, and calculating an average of the flow rates in the first half of time period t and an average of the flow rates in the second half of time period t again until the threshold is obtained.

\* \* \* \* \*